United States Patent [19]

Laing

[11] Patent Number: 5,213,860
[45] Date of Patent: May 25, 1993

[54] PLASTIC AMPUL

[75] Inventor: Christian Laing, Charlesbourg Ouest, Canada

[73] Assignee: Confab Guy Lamarre Inc., Longueuil, Quebec, Canada

[21] Appl. No.: 606,811

[22] Filed: Oct. 31, 1990

[51] Int. Cl.$^5$ .............................................. B65D 1/09
[52] U.S. Cl. .................. 428/36.92; 428/36.9; 428/35.7; 604/415; 222/541; 215/32; 215/253; 215/256; 215/DIG. 3
[58] Field of Search ................... 215/32, DIG. 3, 253, 215/256; 604/200, 415; 53/328; 428/36.92, 35.7, 412, 36.8, 36.9; 424/451; 206/601, 528, 532, 540; 222/541

[56] References Cited

U.S. PATENT DOCUMENTS

| | | | |
|---|---|---|---|
| 1,718,595 | 6/1929 | Smith | 604/403 |
| 3,589,884 | 6/1971 | Guiriec | 215/32 |
| 4,337,025 | 6/1982 | Pagels et al. | 425/392 |
| 4,512,475 | 4/1985 | Federighi | 215/32 |
| 4,872,872 | 10/1989 | Polak | 215/32 |
| 4,964,521 | 10/1990 | Wieland | 215/32 |
| 4,979,630 | 12/1990 | Rose | 215/32 |
| 5,024,865 | 6/1991 | Insley | 428/36.4 |
| 5,076,452 | 12/1991 | Hashimoto | 215/32 |

FOREIGN PATENT DOCUMENTS

| | | |
|---|---|---|
| 1241250 | 8/1960 | France . |
| 829469 | 3/1960 | United Kingdom . |

Primary Examiner—Ellis P. Robinson
Assistant Examiner—Rena L. Dye
Attorney, Agent, or Firm—Foley & Lardner

[57] ABSTRACT

An ampul for containing a physiologically acceptable liquid comprises a tubular body made of a non-toxic, chemically inert thermoplastic material having an elongation at break ranging from about 100% to about 200%, a tensile strength at break less than about 15,000 psi and a flexural modulus less than about 400,000 psi. The tubular body has at least one end portion of reduced cross-sectional dimension formed with a peripheral line of weakness enabling the end portion to be manually fractured. The ampul according to the invention is impact-resistant and forms a clean cut when the end portion is fractured to dispense its content, thereby eliminating dangerous shards.

27 Claims, 1 Drawing Sheet

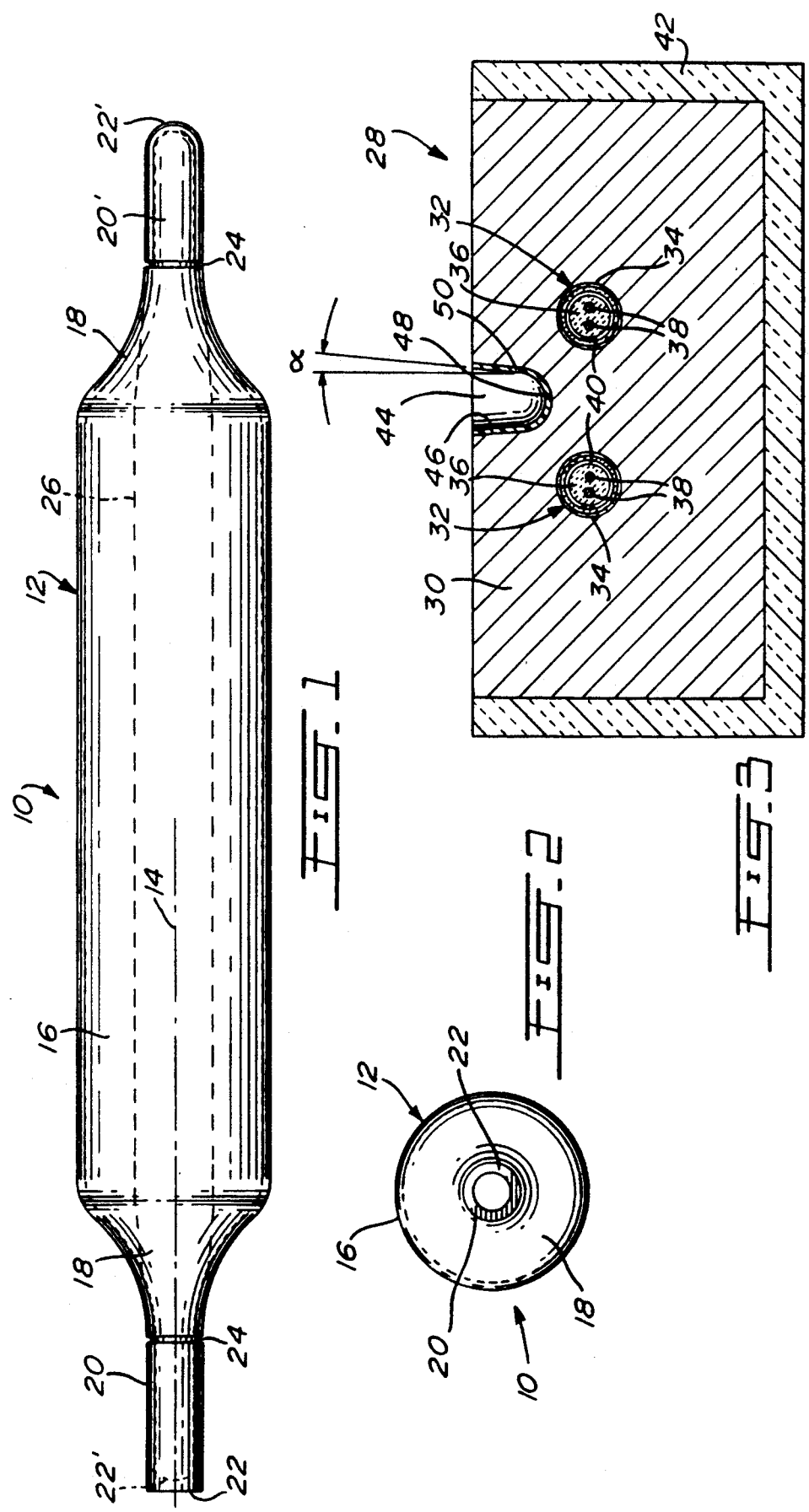

PLASTIC AMPUL

BACKGROUND OF THE INVENTION

The present invention relates to improvements in the field of unit-dose containers. More particularly, the invention is directed to an improved ampul for containing a physiologically acceptable liquid and to a process for producing same.

Glass ampuls containing hypodermic solutions or drinkable liquids such as vitamin solutions are known. These generally consist of a small cylindrical glass vessel which is hermetically sealed to preserve its content and has either one or two elongated end portions of reduced diameter formed with a circumferencial line of weakness, depending upon the intended use. In order to dispense the content of such a glass vessel, it is necessary to sever the end portions by applying with one's fingers a breaking force adjacent the circumferential line of weakness especially provided for this purpose. As a result, the ends are often severed forming jagged edges which may cause injuries to the fingers. Glass shards are also produced during severing and these may fall into the dispensed liquid, thus contaminating same. Moreover, if a glass ampul is inadvertently dropped on a solid surface, it usually shatters into multiple glass fragments.

SUMMARY OF THE INVENTION

It is therefore an object of the present invention to overcome the above disadvantages and to provide an improved ampul which is impact resistant and forms a clean cut when severed to dispense its content, thereby eliminating dangerous shards.

In accordance with one aspect of the invention, there is provided an ampul for containing a physiologically acceptable liquid, comprising a tubular body made of a non-toxic, chemically inert thermoplastic material having an elongation at break ranging from about 100% to about 200%, a tensile strength at break less than about 15,000 psi and a flexural modulus less than about 400,000 psi. The tubular body has at least one end portion of reduced cross-sectional dimension formed with a peripheral line of weakness enabling the end portion to be manually fractured.

Applicant has found quite unexpectedly that by utilizing a thermoplastic material which has an elongation to break ranging from about 100% to about 200%, a tensile strength at break less than about 15,000 psi and a flexural modulus less than about 400,000 psi, it is possible to produce from such a material an ampul which offers exceptional impact resistance and yet can be manually fractured along a line of weakness with the formation of a clean cut, thereby eliminating dangerous shards. An elongation at break of about 100% to about 200% ensures the formation of a clean cut along the line of weakness, whereas a tensile strength at break less than about 15,000 psi and a flexural modulus less than about 400,000 psi enable the end portion of the ampul to be fractured with one's fingers. Such a thermoplastic material must also be non-toxic and chemically inert so as to be suitable for food contact and medical applications.

Examples of suitable thermoplastic polymers which meet the above requirements include acrylonitrile-butadiene-styrene resin, cellulose acetate, cellulose acetate butyrate, cellulose propionate, polyacetal, polyacrylate, polyarylate, polyamide, polybutene, polybutene terephthalate, polycarbonate, polyetherimide, sulfonated polyether, polyethylene, polyethylene terephthalate, polymethylpentene, polyphenylene oxide, polypropylene, polystyrene, styrene-acrylonitrile copolymer, styrenemaleic anhydride copolymer, polysulfone and polyvinyl chloride.

The thermoplastic material is preferably transparent for enabling one to view the content of the ampul. Amongst the above-mentioned thermoplastic polymers, those which provide transparency are cellulose acetate, cellulose acetate butyrate, cellulose propionate, polyacrylate, polyarylate, amorphous polyamide, polycarbonate, polyetherimide, sulfonated polyether, polyethylene terephthalate, polystyrene, styrene-acrylonitrile copolymer, styrene-maleic anhydride copolymer, polysulfone and polyvinyl chloride.

Where it is necessary to sterilize the content of a filled ampul according to the invention, by subjecting the filled ampul to water vapor at a temperature of about 250° F. in an autoclave, the thermoplastic material must also have a Vicat softening point of a least about 300° F. so as to resist deformation during sterilization. Amongst the above-mentioned thermoplastic polymers, those which met this additional requirement are polyacetal, polyarylate, polyamide, polycarbonate, polyetherimide, polyphenylene oxide sulfonated polyether and polysulfone.

Particularly preferred thermoplastic polymers for use in accordance with the invention are polycarbonate resins sold under the trade marks MAKROLON and CALIBRE, such as MAKROLON FCR-2458 which is a polycarbonate resin having a Vicat softening point of 304° F., an elongation at break of 120%, a tensile at break of 10,000 psi and a flexural modulus of 330,000 psi, and CALIBRE 200-10 which is a polycarbonate resin having a Vicat softening point of 312° F., an elongation at break of 150%, a tensile strength at break of 10,300 psi and a flexural modulus of 350,000 psi.

A preferred ampul according to the invention for containing drinkable liquids comprises a tubular body having a longitudinal axis and including an elongated central portion merging at each end with a coaxial neck portion terminating in an outwardly extending end portion of reduced cross-sectional dimension, each end portion being formed with the aforementioned line of weakness.

The plastic ampul of the invention is advantageously produced by injection blow molding.

The present invention therefore provides, in another aspect thereof, a process for producing an ampul as defined above, comprising the steps of:

a) injecting the thermoplastic material in molten state into an injection mold to produce a tubular preform of substantially uniform cross-sectional dimension having at least one end portion formed with a peripheral line of weakness;

b) withdrawing the preform from the injection mold and transferring same into a blow mold; and c) expanding an elongated portion of the preform adjacent the at least one end portion thereof in the blow mold to produce an ampul comprising a tubular body having at least one end portion of reduced cross-sectional dimension formed with a peripheral line of weakness.

It is also possible to allow the preform to solidify by cooling after it has been withdrawn from the injection mold, and then to reheat the preform to a semi-solid state and blow molding same while in the semi-solid state in the blow mold.

According to a preferred embodiment of the invention, where use is made of a polycarbonate resin such as MAKROLON FCR-2458 or CALIBRE 200-10, the injection mold is maintained at a temperature of about 420° F. and the polycarbonate resin is injected at a temperature of about 550° F. into the injection mold to provide the desired preform. The preform is then withdrawn at a temperature of about 420° F. from the injection mold and blow molded at the same temperature in the blow mold, thereby ensuring that the polycarbonate resin has a melt strength sufficient to permit the elongated portion to expand without rupturing. Alternatively, the injection mold can be maintained at a temperature of about 130° F. and the polycarbonate resin injected at a temperature of about 550° F. into the injection mold; the preform can be thereafter withdrawn from the injection mold, allowed to solidify by cooling and then reheated to a temperature of about 420° F. before being blow molded at such a temperature in the blow mold.

The plastic ampul according to the invention combines security with excellent dimensional stability, and is suitable for food contact and medical applications.

BRIEF DESCRIPTION OF THE DRAWINGS

Further features and advantages of the invention will become more readily apparent from the following description of a preferred embodiment as illustrated by way of example in the accompanying drawings, wherein:

FIG. 1 is a side elevational view of a plastic ampul according to a preferred embodiment of the invention, with one of the extremities being opened for allowing filling of same with a physiologically acceptable liquid;

FIG. 2 is an end view thereof, taken from the left of FIG. 1; and

FIG. 3 is a sectional view of a device for sealing the open extremity of the ampul illustrated in FIG. 1.

DESCRIPTION OF PREFERRED EMBODIMENTS

Referring first to FIGS. 1 and 2, there is illustrated a plastic ampul generally designated by reference numeral 10, for containing a physiologically acceptable liquid. The ampul 10 comprises a tubular body 12 of circular cross-section having a longitudinal axis 14 and including an elongated central portion 16 merging at each end with a coaxial neck portion 18 of reduced diameter. One of the neck portions 18 terminates in an outwardly extending end portion 20 with an open extremity 22, whereas the other neck portion terminates in a similar end portion 20' but having a sealed extremity 22'. The extremities are conveniently sealed by means of the device illustrated in FIG. 3, which will be described hereinafter.

A circumferential groove 24 of rectangular cross-section is provided intermediate each neck portion 18 and adjacent end portion 20,20'. Each groove 24 extends in a plane intersecting the longitudinal axis 14 at right angles and defines a line of weakness enabling the end portions 20 and 20' to be manually fractured along such lines of weakness.

The elongated central portion 16 and neck portion 18 of the ampul 10 illustrated in FIG. 1 are formed by blow molding a cylindrical preform 26 of substantially uniform diameter, which is produced by injection molding.

In order to fill the ampul 10 with a physiologically acceptable liquid, the end portion 20 with the open extremity 22 is dipped into a bath containing the desired liquid, in a chamber which is thereafter evacuated by creating a partial vacuum in the chamber over a short period of time. When the atmospheric pressure is re-established, the differential pressure created causes the liquid to enter through the open extremity 22 and into the central portion 16, thereby filling the ampul 10.

Once the ampul 10 has been filled, the open extremity 22 is sealed by means of the sealing device illustrated in FIG. 3.

As shown in FIG. 3, the sealing device which is generally designated by reference numeral 28 comprises a core 30 made of a metal or metal alloy having a high thermal conductivity (i.e. 100-160 W/m.°K.) and two cartridge heaters 32 embedded in the core 30. Each cartridge heater 32 comprises a cylindrical sheath 34 made of a high-temperature alloy surrounding a core 36 of ceramic material. Two electrical conductors 38 extend through the ceramic core 36 and are connected to a helically wound resistance wire 40. A thermally insulating material 42 surrounds the metal core 30. The cartridge heaters 32 are operative to heat the metal core 30 to the melting temperature of the thermoplastic material from which the ampul 10 is made.

A cavity 44 is provided in the metal core 30 for receiving the end portion 20 of the ampul 10 whose extremity 22 is to be sealed. The cavity 44 is defined by an outwardly diverging inner sidewall 46 merging with a hemispherical bottom wall 48, the sidewall 46 forming an angle a of about 5° relative to the longitudinal axis of the cavity so as to permit a proper flow of melted plastic to adequately seal the extremity 22, and also to facilitate withdrawal of the ampul end portion 20 after the extremity 22 has been sealed. The sidewall 46 and bottom wall 48 are covered with a coating 50 of an antistick material; such as polytetrafluoroethylene, to prevent the plastic of the ampul from adhering to the metal core 30.

I claim:

1. An ampul useful for containing a physiological acceptable liquid comprising a tubular body having at least one end portion of reduced, substantially uniform cross-sectional dimension formed with a peripheral line of weakness, wherein said tubular body is made of a non-toxic, chemically inert thermoplastic material having an elongation at break ranging from about 100% to about 200%, a tensile strength at break less than about 15,000 psi and a flexural modulus less than about 400,000 psi, whereby said at least one end portion is manually fracturable along said line of weakness with the formation of a clean cut, thereby eliminating undesirable shards.

2. An ampul as claimed in claim 1, wherein said thermoplastic material comprises a polymer selected from the group consisting of acrylonitrilebutadiene-styrene resin, cellulose acetate, cellulose acetate butyrate, cellulose propionate, polyacetal, polyacrylate, polyarylate, polyamide, polybutene, polybutene terephthalate, polycarbonate, polyetherimide, sulfonated polyether, polyethylene, polyethylene terephthalate, polymethylpentene, polyphenylene oxide, polypropylene, polystyrene, styrene-acrylonitrile copolymer, styrene-maleic anhydride copolymer, polysulfone and polyvinyl chloride.

3. An ampul as claimed in claim 1, wherein said thermoplastic material is transparent.

4. An ampul as claimed in claim 3, wherein said transparent thermoplastic material comprises a polymer selected from the group consisting of cellulose acetate, cellulose acetate butyrate, cellulose propionate, polyacrylate, polyarylate, amorphous polyamide, polycarbonate, polyetherimide, sulfonated polyether, polyethylene terephthalate, polystyrene, styrene-acrylonitrile copolymer, styrene-maleic anhydride copolymer, polysulfone and polyvinyl chloride.

5. An ampul as claimed in claim 1, wherein said thermoplastic material has a Vicat softening point of at least about 300° F.

6. An ampul as claimed in claim 5, wherein said thermoplastic material comprises a polymer selected from the group consisting of polyacetal, polyarylate, polyamide, polycarbonate, polyetherimide, polyphenylene oxide, sulfonated polyether and polysulfone.

7. An ampul as claimed in claim 6, wherein said polymer is a polycarbonate resin.

8. An ampul as claimed in claim 7, wherein said polycarbonate resin has a Vicat softening point of 304° F., an elongation at break of 120%, a tensile strength at break of 10,000 psi and a flexural modulus of 330,000 psi.

9. An ampul as claimed in claim 7, wherein said polycarbonate resin has a Vicat softening point of 312° F., an elongation at break of 150%, a tensile strength at break of 10,300 psi and a flexural modulus of 350,000 psi.

10. An ampul as claimed in claim 1, wherein said physiologically acceptable liquid comprises a hypodermic solution or drinkable liquid.

11. An ampul as claimed in claim 2, wherein said thermoplastic material comprises a transparent polymer selected from the group consisting of cellulose acetate, cellulose acetate butyrate, and cellulose propionate.

12. An ampul as claimed in claim 2, wherein said polymer comprises an acrylonitrile-butadiene-styrene resin, a transparent styrene-acrylonitrile copolymer, or a transparent styrene-maleic anhydride copolymer.

13. An ampul as claimed in claim 2, wherein said polymer comprises a polyacetal having a Vicat softening point of at least about 300° F.

14. An ampul as claimed in claim 2, wherein said polymer comprises a transparent polyacrylate.

15. An ampul as claimed in claim 2, wherein said polymer comprises a transparent polyarylate having a Vicat softening point of at least about 300° F.

16. An ampul as claimed in claim 2, wherein said polymer comprises a transparent polyamide having a Vicat softening point of at least about 300° F.

17. An ampul as claimed in claim 2, wherein said polymer comprises a transparent polyetherimide having a Vicat softening point of at least about 300° F.

18. An ampul as claimed in claim 2, wherein said polymer comprises a transparent sulfonated polyether having a Vicat softening point of at least about 300° F.

19. An ampul as claimed in claim 2, wherein said polymer comprises a polyphenylene oxide having a Vicat softening point of at least about 300° F.

20. An ampul as claimed in claim 2, wherein said polymer comprises transparent polyethylene terephthalate or polybutylene terephthalate.

21. An ampul as claimed in claim 2, wherein said polymer comprise polybutene or polymethyl pentene.

22. An ampul as claimed in claim 2, wherein said polymer comprises transparent polysulfone having a Vicat softening point of at least about 300° F.

23. An ampul as claimed in claim 1, wherein said tubular body has a longitudinal axis and includes an elongated central portion merging at least on one end with a coaxial neck portion terminating in an outwardly extending end portion having a cross-sectional dimension less than the other portions of the tubular body including said elongated central portion, wherein said end portion is formed with a peripheral line of weakness.

24. An ampul as claimed in claim 23, wherein said tubular body consists of an elongated central portion merging at least on one end with a coaxial neck portion terminating in an outwardly extending end portion having a cross-sectional dimension less than said elongated central portion, wherein said end portion is formed with a peripheral line of weakness.

25. An ampul as claimed in claim 23, wherein said tubular body consists of an elongated central portion merging at both ends with a coaxial neck portion terminating in an outwardly extending end portion having a cross-sectional dimension less than said elongated central portion, wherein both of said end portion is formed with a peripheral line of weakness.

26. An ampul comprising a tubular body having at least one end portion of reduced, substantially uniform cross-sectional dimension formed with a peripheral line of weakness, wherein said tubular body is made of a non-toxic, chemically inert thermoplastic material having an elongation at break ranging from about 100% to about 200%, a tensile strength at break less than about 15,000 psi and a flexural modulus less than about 400,000 psi, whereby said at least one end portion is manually fracturable along said line of weakness with the formation of a clean cut, thereby eliminating undesirable shards, wherein said tubular body has a longitudinal axis and includes an elongated central portion merging at each end with a coaxial neck portion terminating in an outwardly extending end portion of reduced cross-sectional dimension, each end portion being formed with said peripheral line of weakness.

27. An ampul as claimed in claim 26, wherein the line of weakness of each end portion is defined by a groove of rectangular cross-section extending in a plane intersecting said longitudinal axis at right angles.

* * * * *